(No Model.)
A. WEED & J. ROCKWELL.
DEVICE FOR RAISING AND LOWERING PROPELLERS.
No. 444,475. Patented Jan. 13, 1891.
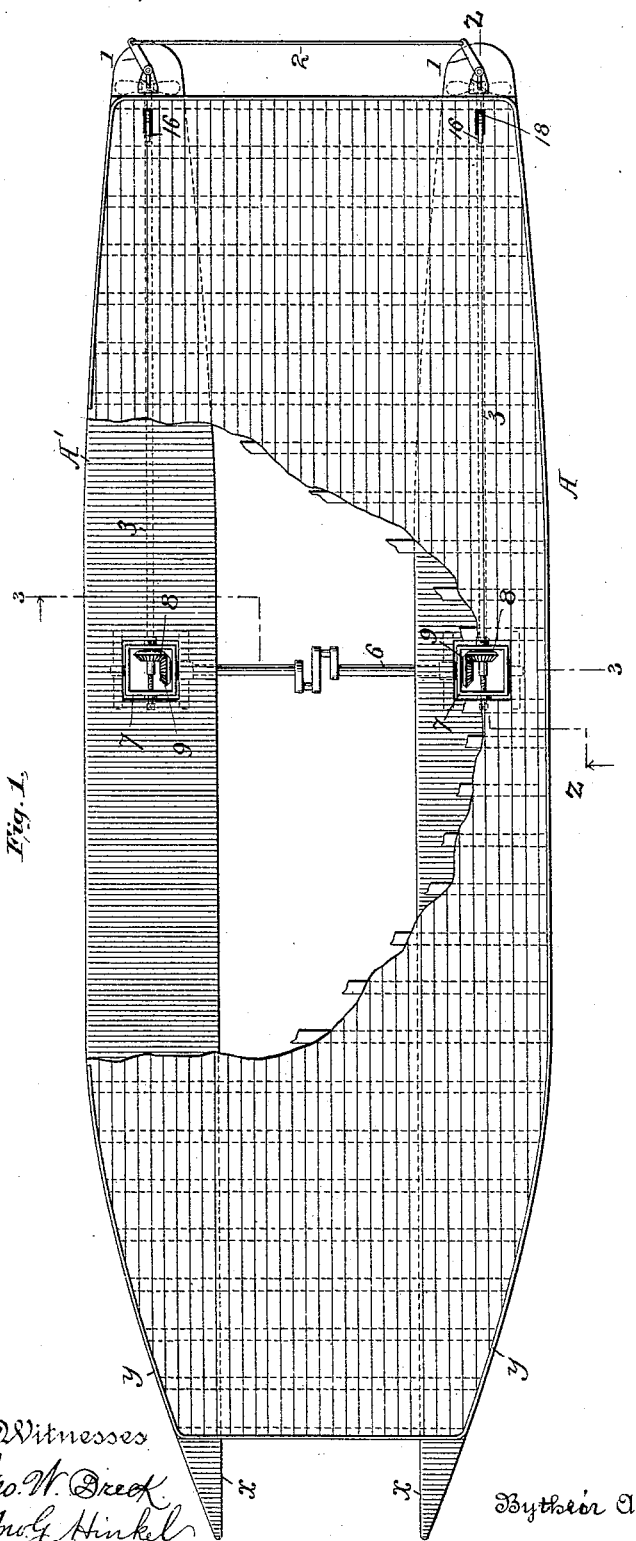
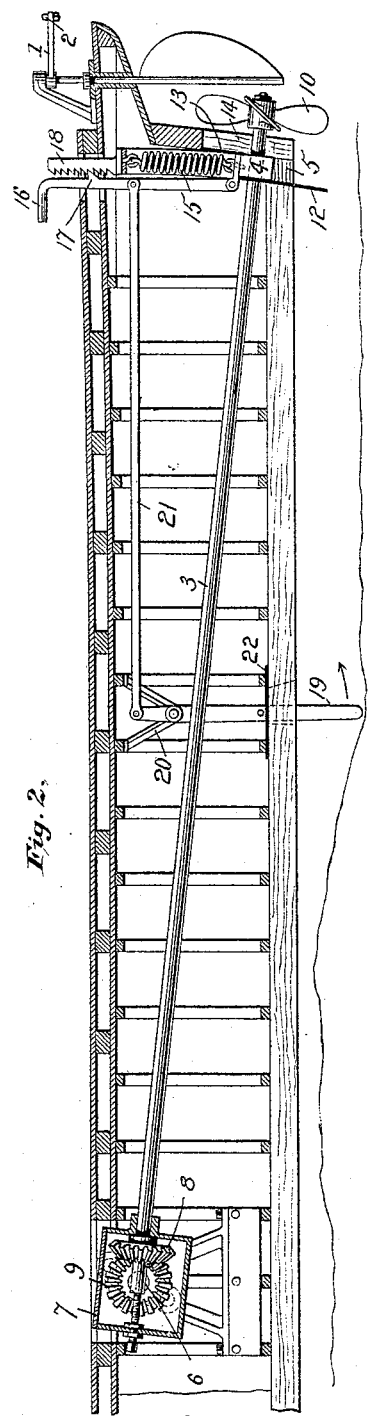

UNITED STATES PATENT OFFICE.

ALFRED WEED AND JOHN ROCKWELL, OF TARRYTOWN, NEW YORK.

DEVICE FOR RAISING AND LOWERING PROPELLERS.

SPECIFICATION forming part of Letters Patent No. 444,475, dated January 13, 1891.

Application filed May 23, 1890. Serial No. 352,876. (No model.)

*To all whom it may concern:*

Be it known that we, ALFRED WEED and JOHN ROCKWELL, citizens of the United States, and residing at Tarrytown, Westchester county, State of New York, have invented certain new and useful Improvements in Devices for Raising and Lowering Propellers, of which the following is a specification.

Our invention relates to improvements in the appliances for raising and lowering the propeller wheel or wheels of vessels; and our invention consists in constructing the parts, as fully set forth hereinafter and as illustrated in the accompanying drawings, in which—

Figure 1 is a plan view, part of the deck being broken away, illustrating a double-hull vessel embodying our invention. Fig. 2 is a longitudinal section arranged on the line $z$, Fig. 1.

The hull of the vessel may be constructed in any desired form, but for certain purposes it is preferably a "catamaran," as shown in Fig. 1; but each of the two sections A A', instead of having the bow portion tapering from opposite sides, as usual in catamarans, has an inner flat side $x$ and an outer curved side $y$, while at the stern each side is tapering, as usual. This avoids the collection of water into the intervening channel at the bow, while the body of water driven by the two screws into the channel at the stern, reacting upon the opposite tapering sides, aids in the forward propulsion. The rudder-posts are supported in any suitable manner and each has an arm 1, and the two arms are connected by a rod 2, so that both rudders will turn together. The propeller-shaft 3, instead of being mounted upon fixed bearings, passes at the stern through a bearing-lock 4, which is capable of vertical movement in a curved groove or guide 5, the curve of which corresponds to a circle having the axis of a transverse driving-shaft 6 at its center, and on said transverse driving-shaft swings a box or frame bearing 7, supporting the inner end of the shaft, a spur-wheel 9 upon the latter gearing with a similar wheel 8 upon the propeller-shaft. By this arrangement the angle of the inner bearing-box shifts in accordance with the movement of the propeller-shaft around the common center. At the outer end of the propeller-shaft is a propeller-wheel 10, of any suitable construction, set sufficiently far from the stern-post to avoid contact with the latter whatever may be the position of the shaft, the stern-post having a slot 14 to permit of the vertical movement of the shaft, so that by raising and lowering the bearing 4 the propeller-wheel may be raised or lowered to any desired position.

To prevent water flowing into the hold, guide-plates 12 and 13 are fastened to the bearings 4, so as at all times to keep the opening at the stern closed, while permitting the adjustment of the bearing.

To prevent accidents which would be liable to result in sailing in shallow waters from the contact of the propeller-blades with the bottom or with rocks near the surface when the propeller is set to a position for its edge to extend below the keel, we combine with the bearing 4 any suitable elevator tending to lift said bearing and lock the latter in its lowest position and provide a trigger projecting below the keel to release the bearing. Should the trigger strike any object, the elevator will automatically raise the bearing.

The elevator may be in the form of a counter-weight or otherwise constructed; but for small vessels we prefer to make it in the form of a spring 15, connected to the bearing and to any suitable fixed support above and tending to lift the bearing. As shown, the lock 16 is in the form of a lever carried by the bearing and provided with a lip 17, engaging the teeth of a stationary rack 18, and the trigger 19 is a lever pivoted to a fixed support 20 and connected to the locking-lever by a rod 21. The trigger 19 extends through a slot in the hull, guarded by a sliding plate 22, to a point below that to which the blades of the propeller extend when the wheel is in its lowest position, and should the trigger strike a rock or the bottom it will be swung in the direction of the arrow, retract the locking-lever, and release the bearing 4, which will at once be raised by the elevator 15 until the wheel is wholly above the keel.

We have shown a section of each hull of a catamaran as provided with a vertically-adjustable propeller; but it is evident that our invention is equally applicable to vessels with a single hull and using either one screw-propeller or two.

Without limiting ourselves to the precise construction and arrangement of parts shown, we claim—

1. The combination, with a vessel having a slot and curved guides at the stern-post, of a propeller-shaft passing through said slot and having its outer end supported in a bearing-box which is mounted to move in said curved guides and its inner end mounted in a pivoted box at the center of curvature of the guides, substantially as described.

2. The combination, with the pivoted propeller-shaft passing through a vertically-adjustable box at the stern, of an elevator for raising said box, a detent for holding the box against the action of the elevator, and a trigger projecting beyond the keel and connected with the detent, substantially as set forth.

3. The combination of the pivoted propeller-shaft, outer bearings vertically adjustable, spring connected with said bearing and with a fixed support, a detent connected with the bearing and engaging with a rack, and a trigger connected with said detent and projecting beyond the keel, substantially as described.

In testimony whereof we have signed our names to this specification in the presence of two subscribing witnesses.

ALFRED WEED.
JOHN ROCKWELL.

Witnesses as to Alfred Weed:
DANIEL E. DELAVAN,
A. B. WILMOT.
Witnesses as to John Rockwell:
FRANK TURNER,
W. D. LEWIS.